Patented Mar. 14, 1950

2,500,210

UNITED STATES PATENT OFFICE 2,500,210

PREPARATION OF AN OXO SYNTHESIS CATALYST

Robert E. Schexnailder, Jr., Baton Rouge, La., assignor to Standard Oil Development Company, a corporation of Delaware No Drawing. Application October 31, 1946, Serial No. 707,033

3 Claims. (Cl. 252—451)

The present invention is concerned with improved catalysts. The invention is more particularly directed to catalysts comprising silica which are suitable for oxo-synthesis reactions. In accordance with my invention improved oxo-synthesis catalysts are prepared by impregnating a gel comprising silica with salts of cobalt, thorium and copper and then decomposing these salts on the silica.

It is well known in the art to conduct hydrocarbon synthesis reactions by contacting hydrogen and oxides of carbon with catalysts under various temperature and pressure conditions. The catalyst employed is usually selected from the iron group metals, as for example, iron, cobalt and nickel. The catalysts are utilized either alone or are employed in conjunction with carriers, such as kieselguhr, diatomaceous earth, synthetic gels, silica and alumina. Promotors, such as oxides of sodium, potassium, chromium, zinc, aluminum, magnesium, and the rare earth metals are used with the iron group metals. These catalysts are employed in either fixed bed or fluid catalyst operations.

The temperatures employed in the synthesis reaction vary widely, as for example, in the range from about 300° F. to about 800° F. and are generally in the range from about 350° F. to about 700° F. The pressures, likewise vary considerably and are a function of other operating conditions, such as catalyst employed, activity of the catalyst, character of the feed gases and the temperature utilized. Pressures in the range from about 1 to 100 and higher atmospheres have been suggested. The character of the feed gases introduced into the synthesis reaction zone depends somewhat on the particular temperatures and pressures, and upon the catalyst employed. For example, when employing cobalt type catalyst, it is preferred to use about 1 mol of carbon monoxide to about 2 mols of hydrogen, while when an iron type catalyst is utilized, equal mols of hydrogen and carbon monoxide in the feed synthesis gases are desirable.

The synthesis gases comprising hydrogen and carbon monoxide are produced by various procedures. Methane or natural gas may be oxidized with a reducible metal oxide or with pure oxygen. Other feed stocks may comprise coal, shale and other hydrocarbons. The reaction may be conducted in a single or in a plurality of stages. One procedure is to employ a two-stage reforming process using steam and carbon dioxide. When employing methane as a feed gas and reducing the same with a reducible metal oxide, the reactions are generally conducted at temperatures in the range from about 1400° F. to about 2000° F.

It has, heretofore, been known in the art to contact gases and solids by passing the gases upwardly through an enlarged treating zone, containing a body of finely divided solids to be contacted, at a controlled velocity to maintain the solids in the treating zone in a quasi-liquid like state. Under properly controlled conditions, the subdivided solid particles are not only maintained in a highly turbulent, quasi-liquid and ebullient state, but there exists a rapid and overall circulation of the fluidized solids throughout the fluid bed.

Processes of this character, wherein fluidized solids are contacted with gases, have a number of inherent and important advantages. For example, intimate contact between the gases and the fluid subdivided solids is secured. It is also possible to maintain a substantially uniform temperature throughout the bed as a result of the extremely rapid transfer of heat from one section of the bed to the other because of the rapid circulation of the fluid subdivided solids. Furthermore, due to the rapid transfer of heat between the solids under these conditions, it is possible to readily add or extract heat from the mass at an extremely rapid rate.

In fluid operations catalyst particles generally comprise particles having a micron size in the range from about 20 to 200 microns and higher. These particles are suspended in a fluid ebullient state by means of an upflowing suspending gas, the velocity of which is in the range from about 0.1 to 5.0 and higher feet per second.

In hydrocarbon synthesis reactions as discussed heretofore, it is known to add olefins with the feed gases comprising carbon monoxide and hydrogen in order to secure production of oxygenated compounds in accordance with the oxo-synthesis reaction. The oxo-synthesis reaction involves reacting olefins with a mixture of carbon monoxide and hydrogen in the presence of a cobalt containing catalyst or an equivalent catalyst to form an aldehyde which is usually hydrogenated to the corresponding alcohol. The ratio of hydrogen to carbon monoxide may vary appreciably. Ratios of 0.5 volumes of hydrogen to 4.0 volumes of hydrogen per volume of carbon monoxide are employed. The preferred ratios comprise about 1.0 volume of hydrogen per volume of carbon monoxide. The quantities of olefins employed per volume of synthesis gas likewise vary considerably, as well as the composition of the olefin feed stream. The oxo-synthesis reaction is generally conducted employing a pressure in the range of about 100 to 300 atmospheres and a temperature in the range of about 200° F. to 400° F.

In the hydrogenation step, any catalyst as, for example, nickel, tungsten, or sulfides of group VI and group VIII metals of the periodic table may be utilized. The hydrogenation temperatures are generally in the range from about 150° F. to 450° F. while the pressures are usually in the range of about 100 to 300 atmospheres. The quantity of synthesis gas with respect to olefins utilized may vary considerably as, for example, from 1000 to 45,000 cu. ft. of carbon monoxide and hydrogen per barrel of olefin feed. In general, approximately 2,500 to 15,000 cu. ft. of synthesis gas per barrel of olefin feed is employed.

I have, however, discovered an improved catalyst and the method for manufacturing the same which will produce superior results in an oxo-synthesis reaction. In accordance with my invention a hydrogel comprising silica is impregnated with salts of cobalt, thorium and copper. The salts are subsequently decomposed to give a catalyst of superior quality. The silica hydrogel may be prepared by any suitable method. One method is to prepare the silica hydrogel by mixing an alkali silicate with an acid. The alkali silicate usually comprises a sodium silicate

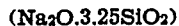

solution having a specific gravity of about 1.2. This is mixed with a sulfuric acid having a specific gravity somewhere in the range of about 1.19. The hydrosol may be impregnated with a soluble salt of the desired metal or the hydrosol may be allowed to gel and the resulting hydrogel washed and soaked in a solution comprising the salt of the desired metal or metals.

Another method which may be employed for the preparation of the silica hydrogel is to mix sulfuric acid with an alkali metal silicate. The silica hydrosol is treated with magnesia under conditions to form the silica hydrogel and magnesia sulfate. The magnesia is removed by washing with water. The resulting silica hydrogel is impregnated with any suitable salt of cobalt, thorium and copper. As pointed out heretofore, the silica hydrosol may be impregnated, before treating with the magnesia, with the salts of cobalt, thorium and copper. The process of my invention may be readily understood by reference to the following examples illustrating the same.

*Example 1*

A sodium silicate ($Na_2O.3.25SiO_2$) solution having a specific gravity 1.2 was prepared. This solution was mixed with a sulfuric acid solution having a specific gravity somewhere in the range of about 1.19. The hydrogel was washed and mixed with nitrates of cobalt, thorium and copper. The mixing was made by mulling the silica hydrogel with the nitrates. The plasticized mass was heated to a temperature of 550° F. to decompose the nitrates to the metallic oxides. The catalyst was activated at a temperature of about 850° F.

The catalyst comprised 65% silica, 32% cobalt, 5% thoria and 1% copper.

*Example 2*

The catalyst prepared in accordance with Example 1 was employed in a synthesis zone operating at a temperature of about 275° F. and at a pressure of about 3,000 pounds per square inch. The feed comprised di-isobutylene, hydrogen and carbon monoxide. The feed rate of di-isobutylene as compared to hydrogen and carbon monoxide was about 1.6 mols of di-isobutylene to 1 mol of hydrogen and 1 mol of carbon monoxide.

*Example 3*

A catalyst prepared in accordance with Example 1 was used to contact olefins, hydrogen and carbon monoxide in a synthesis reaction zone. The results of the operation were as follows:

| | |
|---|---|
| Temperature, °F | 700 |
| $H_2$ rate, v./v./hr | 4000 |
| Wt. per cent catalyst on olefin feed | 13 |
| Feed | Di-isobutylene |
| Oxo operation: | |
|   Hours of run | 5 |
|   Temperature, °F | 275 |
|   Pressure, p. s. i. g | 3000 |
| Hydrogenation operation: | |
|   Hours of run | 12 |
|   Temperature, °F | 350 |
|   Pressure, p. s. i. g | 2500 |
| Liquid product inspections: | |
|   Hydroxyl No | 286 |
|   Carbonyl No | 9 |
|   Saponification No | 7 |
|   Acid No | 1.3 |
| Recovery, wt. per cent (on liquid feed plus catalyst) | 121 |
| Conversion, per cent | 87 |

My invention comprises treating mixtures comprising olefins, hydrogen and carbon monoxide with a silica hydrogel catalyst impregnated with cobalt, thorium and copper. In general, I prefer the percentage of silica to be in the range from about 15 to 70%, preferably about 60%. I prefer that the cobalt concentration be in the range of 20 to 40%, preferably about 30%. The concentration of thoria is preferably 3 to 8%. The concentration of the copper, I prefer to be in the range below about 5%, preferably in the range from 1 to 3%.

The silica hydrosol may be impregnated before the formation of the hydrogel or the hydrogel may be impregnated after it is formed. Any suitable means may be employed to decompose the salts of cobalt, thorium and copper. In general, the salts are decomposed by subjecting the hydrogel to a heat treatment from about 1 to 6 hours at a temperature in the range from about 400 to 600° F. I then prefer to activate the impregnated silica hydrogel at a temperature in the range of about 800° F. to 1200° F. Any suitable salts may be used, as for example, the nitrates, the sulfates or the chlorates. However, I prefer to employ easily decomposable salts as for example, the nitrates.

The process of my invention is not to be limited by any theory as to mode of operation but only in and by the following claims in which it is desired to claim all novelty.

I claim:

1. Improved process for the preparation of a catalyst suitable for synthesizing oxygenated compounds from olefins, carbon monoxide and hydrogen which consists in preparing a silica hydrosol, causing the said hydrosol to set to a hydrogel, impregnating the silica hydrogel with decomposable salts of cobalt, thorium and copper, subjecting said silica hydrogel to conditions adapted to decompose said salts, activating said catalyst by heating at an elevated temperature, and reducing said catalyst with hydrogen.

2. Process as defined by claim 1 wherein said salts are decomposed by heating.

3. The process of claim 1 wherein said catalyst is reduced at a temperature of about 700° F.

ROBERT E. SCHEXNAILDER, Jr.

REFERENCES CITED

The following references are of record in the file of this patent:

UNITED STATES PATENTS

| Number | Name | Date |
|---|---|---|
| 2,242,553 | Thomas et al. | May 20, 1941 |
| 2,243,869 | Keith et al. | June 3, 1941 |
| 2,244,573 | Roberts | June 3, 1941 |
| 2,257,457 | Fischer et al. | Sept. 30, 1941 |
| 2,327,066 | Roelen | Aug. 17, 1943 |
| 2,338,805 | Dreyfus | Jan. 11, 1944 |
| 2,365,029 | Voorhies | Dec. 12, 1944 |
| 2,387,596 | Marisic | Oct. 23, 1945 |
| 2,417,164 | Huber, Jr. | Mar. 11, 1947 |

FOREIGN PATENTS

| Number | Country | Date |
|---|---|---|
| 553,736 | Great Britain | June 3, 1943 |

OTHER REFERENCES

Petroleum Refiner, Feb. 1944, pages 113 and 114.

Refiner and Natural Gasoline Manufacturer, vol. 17, pages 47–51, 1938.